United States Patent [19]

Crane et al.

[11] Patent Number: 4,750,182

[45] Date of Patent: Jun. 7, 1988

[54] GAS LASERS

[75] Inventors: Dale E. Crane, Santa Clara; Mathew D. Watson, Sunnyvale, both of Calif.

[73] Assignee: Uniphase Corporation, San Jose, Calif.

[21] Appl. No.: 870,794

[22] Filed: Jun. 5, 1986

[51] Int. Cl.[4] .............................................. H01S 3/00
[52] U.S. Cl. ....................................... 372/33; 372/29; 372/87; 372/82; 372/61
[58] Field of Search ...................... 372/33, 87, 98, 29, 372/55, 61, 81, 86, 82

[56] References Cited

U.S. PATENT DOCUMENTS

| | | | |
|---|---|---|---|
| 3,792,372 | 2/1974 | Mark | 331/199 |
| 4,190,810 | 2/1980 | Bayley | 372/61 |
| 4,351,053 | 9/1982 | Van den Brink | 372/61 |
| 4,352,185 | 9/1982 | Crane | 372/29 |
| 4,387,462 | 6/1983 | Markus | 373/32 |
| 4,546,482 | 10/1985 | Bagaglia et al. | 372/61 |
| 4,593,397 | 6/1986 | Proud et al. | 372/87 |
| 4,631,727 | 12/1986 | Crane et al. | 372/29 |

OTHER PUBLICATIONS

"Designer's Handbook"-The Helium-Neon Laser: What it is and How it Works", by Bhogi Patel—Jan. 1983—*Photonics Spectra*.

Primary Examiner—Leon Scott, Jr.
Attorney, Agent, or Firm—Sylvan Sherman

[57] ABSTRACT

The turn-on delay of a gas laser is significantly reduced by inducing a transient electric field of sufficient intensity to induce ionization in a localized region of the laser adjacent to the anode. This is accomplished by means of a coupler which couples the voltage applied to the cathode to a region of the laser immediately adjacent to the anode electrode.

10 Claims, 2 Drawing Sheets

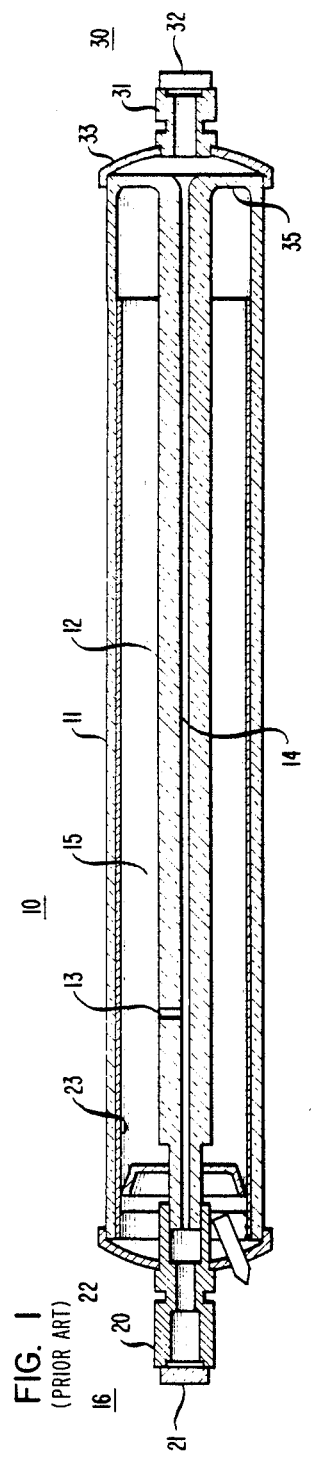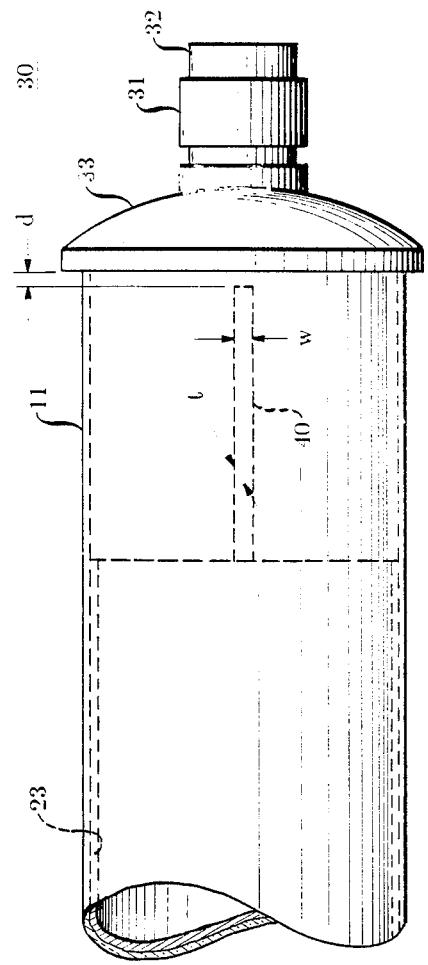
FIG. 1 (PRIOR ART)
FIG. 2

GAS LASERS

TECHNICAL FIELD

This invention relates to cold cathode gas tubes and, in particular, to gas lasers and arrangements for reducing the turn-on delay in such devices.

BACKGROUND OF THE INVENTION

Gas lasers and, in particular, helium-neon (HeNe) lasers are well known in the art. See, for example, the article by Bhogi Patel entitled "The Helium-Neon Laser: What It Is and How It Works" published in the January 1983 issue of *Photonics Spectra*, pp. 33–38. Typically, in such devices, a high d.c. voltage, in the range between 5KV and 10KV, is applied across the tube and its associated current-limiting series resistor in order to break down the gas and establish a steady-state discharge at a normal operating current of a few milliamperes. The process is set in motion when an initiating charged particle (most often an electron present within the gas volume between the tube electrodes, and subject to the electric field established by the applied voltage) gains sufficient energy to produce positive ion-electron pairs by collision with neutral gas atoms. The secondary electrons thus created are, in turn, accelerated by the electric field to produce additional ion-electron pairs, resulting in an exponential growth in the number of charged particles moving in the direction of the electric field. Breakdown, and a transition to the lower voltage, self-sustaining glow discharge mode, occurs when the positive ions formed move to the cathode and produce enough electrons by sedondary emission to replace the initiating electron.

The time delay between the application of the high voltage to the laser tube and the appearance of a glow discharge is termed the breakdown delay. This delay has two components. One component, the statistical delay, is associated with the time required for an ionizing particle to appear at an appropriate place in the tube to initiate breakdown. The other component, termed the formative delay, is the time required for the initial electron avalanche to build up to the point where a glow discharge appears. This latter delay, at the large voltages typically used to start gas lasers, is relatively small compared to the statistical delay and can be neglected for most practical applications. The statistical delay, on the other hand, can be significant.

The mechanical structure of modern gas laser tubes is determined largely by the need to maintain the laser mirrors, that define the laser cavity, in precise optical alignment despite changes in tube temperature and external mechanical vibrations and stresses. As will be described in greater detail hereinbelow, the tube typically includes; (a) a small bore capillary tube whose axis extends between the cavity mirrors, and within which discharge is made to occur; (b) a cylindrical cathode concentric with the bore and electrically connected to a cathode end cap that supports a first cavity mirror; (c) an outer enclosing glass cylinder; and (d) an anode end cap that provide an electrical connection and supports the second cavity-defining mirror.

In structures of this type, starting (i.e., statistical) delays as long as several seconds are often observed. The starting problem is most acute when the tube is shielded from external light sources, or is operated under conditions of very low temperature or humidity.

Techniques for reducing starting delay in gas laser are described, for example, in U.S. Pat. Nos. 3,792,372 and 4,190,810. The first of these patents discloses the use of an additional electrode or a wire loop connected to the power supply through a high resistance. In the second patent, a strip of electrically conductive plastic is disposed on the outer surface of the laser tube, one end of which is electrically connected to the laser anode. While such arrangements may reduce starting time, they do have a number of serious disadvantages. The first disadvantage is that they significantly increase the anode-to-ground capacitance, thereby greatly increasing the likelihood of producing parasitic relaxation oscillations. In order to minimize such oscillations, the added electrode is connected to the anode by means of a very large resistance. This, however, adds to the cost of the device, and presents obvious high-voltage insulation complications and safety hazards.

It is, accordingly, the broad object of the present invention to reduce the starting delay in cold cathode tubes, such at gas lasers.

It is a more specific object of the invention to reduce starting delay in gas lasers without significantly increasing cost or the likelihood of inducing parasitic oscillations.

SUMMARY OF THE INVENTION

It has been discovered, in accordance with the present invention that consistently short starting delays can be realized in gas lasers by producing a transient electrical field of sufficient intensity to induce ionization in a localized region of the laser adjacent to its anode. In the various illustrative embodiments of the invention, at turn-on, a conductive coupler is clamped to the voltage applied to the laser cathode. This voltage is, in turn, coupled to a region of the tube adjacent to the anode, creating a localized high intensity field. In a first embodiment of the invention, the coupler is located within the laser envelope and extends from the end of cathode to a point adjacent to the anode. In this embodiment, the coupler is conductively connected to the cathode and capacitively coupled to the anode.

In two alternative illustrative embodiments of the invention, the coupler is capacitively coupled to both the anode and the cathode. In a first of the alternative embodiments the coupler is located within the laser envelope, whereas in the second alternative embodiment the coupler is located without the laser envelope.

It is a feature of the invention that there is no conductive connection between the coupler and the anode and hence, there is very little added anode-to-ground capacitance. As a consequence there is no significant increase in the likelihood of inducing parasitic relaxation oscillations in such lasers. In addition, the absence of any direct electrical connection between the external coupler and the high voltage portion of the laser circuit eliminates any danger of electrical shock and avoids the added high-voltage insulation requirements imposed by prior art solutions.

These, and other features and advantages of the invention will be described in greater detail hereinbelow in connection with the various figures.

BRIEF DESCRIPTION OF THE DRAWINGS

FIG. 1 shows a typical prior art gas laser;

FIG. 2 shows a gas laser in accordance with the present invention incorporating a conductive coupler for reducing starting time delay.

DETAILED DESCRIPTION

Figure 3:
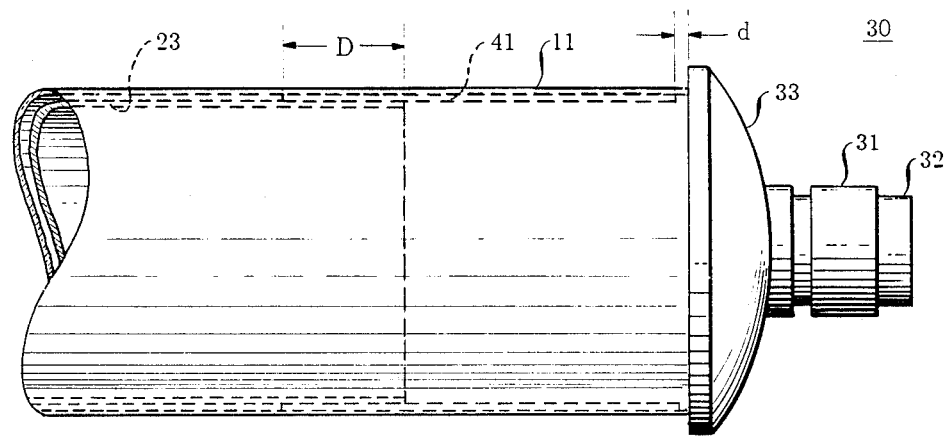
FIGS. 3 and 4 show alternative embodiments of the invention employing conductively insulated internally and externally located couplers.

Referring to the drawings, FIG. 1 shows a longitudinal cross section of a typical prior art gas laser 10. Typically, such devices comprise an outer glass envelope 11, and an inner coaxially aligned, capillary tube 12 which serves as the plasma-discharge confining region of the laser. A cross bore 13, extending through the wall of tube 12, connects the space between tubes 11 and 12 with the bore region 14 within tube 12. A cathode end cap assembly 16 is located at the left end of laser 10. This includes a hollow conductive member 20, at one end of which one of the cavity-defining mirrors 21 is mounted. The other end of member 20 is adapted to receive and support one end of capillary tube 12. The assembly is sealed to the adjacent end of tube 11 by means of an end cap 22. Also extending along the inside wall of laser tube 11 is an electrically and thermally conductive cathode liner 23. The latter, which extends along most of the length of tube 11 serves to maintain a uniform temperature along the laser tube, as explained in U.S. Pat. No. 4,352,185.

Similarly disposed at the right end of the laser is the anode assembly 30 comprising a hollow, electrically conductive member 31, at one end of which a second cavity-defining mirror 32 is located. At this end of the laser, capillary tube 12 is supported by means of a glass septum 35 which extends radially from the end of the tube. A domed end cap 33 secures the anode assembly to the laser tube.

In operation, a large d.c. voltage, of the order of several thousand volt, is impressed across the tube. This creates a very intense electric field which produces ionizing particles at a location in the tube that leads to breakdown. It has been discovered, in accordance with the present invention, that the starting characteristic of devices of this type can be significantly improved by producing a transient electrical field of sufficient intensity to induce ionization in a localized region of the laser adjacent to the laser anode. In a first illustrative embodiment of the invention, this high field is produced by means of a conductive coupler located within the laser envelope 11. This is illustrated in FIG. 2, which shows the anode end of the laser illustrated in FIG. 1, and a portion of the laser cathode liner. Using the same identification numerals as in FIG. 1, the portion shown in FIG. 2 includes anode assembly 30 comprising member 31; mirror 32; end cap 33; and a portion of envelope 11 and cathode liner 23. The coupler in this embodiment consists of a conductive member 40 which is conductively connected to cathode 23 and extends along the inside of envelope 11 to a point a distance d away from anode end cap 33.

Tests have shown that the thickness, t, and the width, w, of conductive member 40 are not the important parameters of the coupler. Rather, it is the distance, d, between the end of the coupler and the anode end cap that determines the efficacy of the mechanism. Consistently good (i.e., low) delay times of milliseconds were obtained when d was between one and two millimeters. As d gets larger, the delays tend to increase. Accordingly, this dimension should be chosen in accordance with the requirements of the system in which the laser is to be used.

It will be noted that in this embodiment the coupler is rigidly connected to the cathode. This means that in order to realize the desired spacing d between the couper end and the anode, the cathode assembly has to be accurately positioned within the tube envelope when the tube is assembled during manufacture. This, however, requires a degree of precision which is otherwise not required in the fabrication of such lasers inasmuch as the location of the cathode liner is not a particularly critical parameter. Thus, the coupler arrangement illustrated in FIG. 2 may not be the most practical embodiment of the invention for lasers of the particular type shown.

An alternative embodiment of the invention which obviates this problem is shown in FIG. 3. In this embodiment, the coupler is deposited along the inside surface of the laser envelope 11 as a thin conductive film or tape 41. The coupler, which is physically independent of the cathode 23, extends from a position adjacent to the anode to a position adjacent to the cathode. As illustrated, the coupler is spaced a distance, d, from anode end cap 33, and overlaps the cathode 23 an amount D. Thus, the desired spacing, d, can be realized without regard to the exact position of the cathode. It has further been discovered that it is not necessary that the coupler and cathode make conductive contact. If they do, the operation of the embodiments of FIGS. 2 and 3 are the same. If, however, conductive contact is not made, the device still operates if the overlap D and the width of the film (not shown) is sufficient to provide enough capacitive coupling between the coupler and the cathode to momentarily clamp the coupler to the cathode voltage (which is typically at ground potential) when the starting high voltage is applied to the tube. Thus, in operation, when the high breakdown voltage is applied to the tube, the coupler momentarily causes a correspondingly high voltage to be produced across the very small gap, d between the coupler and the anode. The extremely high localized electric field initiates a transient avalanche or discharge in the gas within the tube envelope. The resulting particles and radiation from this transient discharge initiates the main discharge between the anode and cathode within the capillary tube.

Figure 4:
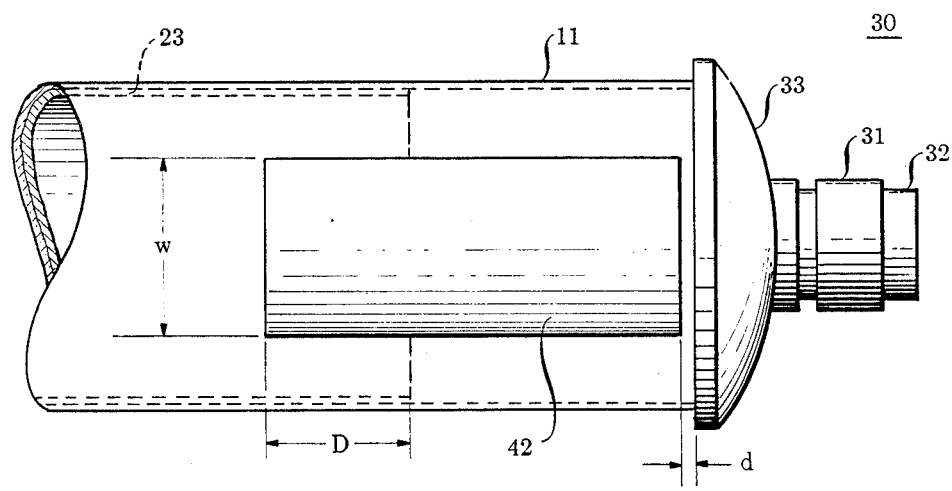

FIG. 4, now to be considered, shows a second alternative embodiment of the invention wherein the coupler 42 is located on the outside surface of the laser tube envelope 11. As in the embodiment of FIG. 3, the coupler is positioned so that it overlaps a portion of cathode 23 at one end, and extends up to, but does not touch anode end cap 33 at is other end. With this embodiment consistently good results, (i.e., starting times of less than 15 msec) were obtained using a ½ inch width strip (w=½) which overlapped the cathode cylinder ½ inch (D=½) and extended to within 1/32 of an inch of the end cap (d=1/32).

As indicated hereinabove, unlike prior art arrangements, none of the couplers is conductively connected to the anode or to the high voltage power supply. Thus, as noted hereinabove, there are no additional voltage insulation requirements imposed upon the tube, and there is no significant increase in the anode-to-ground capacitance.

The coupler itself can be conveniently made from metal foil, or any of the well known commercially available conductive inks, conductive plastics or conductive paints. The conductivity, or conversely the resistivity of the material is not critical, as effective couplers have been made with resistances as high as $10^6\Omega$/in and as low as that of metallic copper.

It will be recognized that the couplers shown are merely illustrative of the coupler configuration that can incorporate the principles of the invention. For example, the coupler may assume other shapes, depending upon the physical configuration of the laser structure into which it is incorporated. Thus, it will be understood that various other embodiments of the invention can be fashioned utilizing appropriate materials, shapes and dimensions in accordance with the teachings of the inventions.

What is claimed is:

1. A gas laser comprising:
   a hermetically sealed, elongated envelope enclosing a gaseous medium capable of supporting stimulated emission of radiation in response to an electric field impressed across said gaseous medium;
   means, including an anode and a cathode, for producing an electric field within said tube when externally energized;
   characterized in that:
   said means further includes coupling means, coupled to said cathode and extending between said cathode and said anode thereby locally increasing the electric field intensity in the region of said medium adjacent to said anode; said increased electric field intensity being a function of the distance between said coupling means and said anode.

2. The laser according to claim 1 wherein said coupling means is located within said envelope.

3. The laser according to claim 2 wherein said coupling means is conductively connected to said cathode.

4. The laser according to claim 2 wherein said coupling means is capacitively coupled to said cathode.

5. The laser according to claim 1 wherein said coupling means is located on the outside of said envelope.

6. The laser according to claim 1 wherein:
   one end of said coupling means is conductively connected to said cathode;
   and the other end of said coupling means is conductively insulared from said anode.

7. The laser according to claim 1 wherein:
   one end of said coupling means is capacitively coupled to said cathode;
   and the other end of said coupling means is conductively insulated from said anode.

8. The laser according to claim 1 wherein said coupling means is a conductive member disposed upon a surface of said envelope.

9. The laser according to claim 1 wherein:
   said cathode includes, along the inside of said envelope, a cylindrical cathode liner which extends along a portion of the length of said envelope;
   and wherein said coupling means extends between said cathode liner and said anode.

10. The laser according to claim 1 wherein:
    said increased electric field intensity induces ionization in said gaseous medium in a localized region of said laser adjacent to said anode.

* * * * *